UNITED STATES PATENT OFFICE.

CHARLES L. MOREHOUSE, OF JACKSON, TENNESSEE.

COMPOSITION FOR LUBRICATING JOURNALS, AXLES, &c.

Specification forming part of Letters Patent No. 31,254, dated January 29, 1861.

*To all whom it may concern:*

Be it known that I, CHARLES L. MOREHOUSE, of Jackson, in the county of Madison and State of Tennessee, have invented a new and useful Composition or Oil-Packing for Lubricating the Journals of Car-Axles, &c.; and I do hereby declare that the ingredients used in making said lubricating composition and the process of mixing or compounding them to make it are described in the following specification, with directions for using said composition when compounded.

To enable others skilled in the art to make and use the lubricating composition which I have invented, I will proceed to describe the best mode of mixing or compounding it known to me, to wit:

I take two quarts of common soft soap and put it in a vessel that will hold one gallon and one-half, and add to the soap one pound of flour or pulverized sulphur and stir the mass until the whole is thoroughly mixed. Then add two ounces of lamp-black and one ounce of pulverized charcoal, and stir the whole until they are thoroughly mixed together. Then take two pounds of fat salt pork and chop it fine, and while chopping add one-fourth of a pound of cotton wool or batting very finely separated, and when the pork and cotton are chopped very fine, add them to the other ingredients and mix the whole thoroughly by stirring, and then add one pound of common fine salt and stir or mix it in. Then add one pint of lard-oil, or half-pint lard and half-pint coal oil and mix the whole well together, when it is ready for use, and may be taken up with a paddle or packing-iron and placed in the journal-boxes of railroad-cars, locomotive-engines, and the working parts of other machinery that needs lubricating.

This packing or lubricating composition prevents the journal and box from heating and burning or destroying the oil supplied to it, so that there is no necessity for supplying the oil so often, as it would be required if the composition were not used. I contemplate that good sperm-oil may be substituted for the lard-oil.

The above-described composition, when properly compounded, should weigh about eleven pounds to the gallon.

The changes of temperature in the weather do not materially affect the thickness or stiffness of this composition, which makes it far superior to all others with which I am acquainted.

I believe I have described and stated the ingredients which compose the lubricating composition which I have invented, and the mode of compounding them, so as to enable any person skilled in the art to make and use it.

I will now state what I desire to secure by Letters Patent, to wit:

The lubricating composition described, compounded of the materials in the proportions and manner specified.

CHARLES L. MOREHOUSE.

Witnesses:
   STEPHEN G. BEALL,
   WILLIAM F. KEADY.